Figure 1:
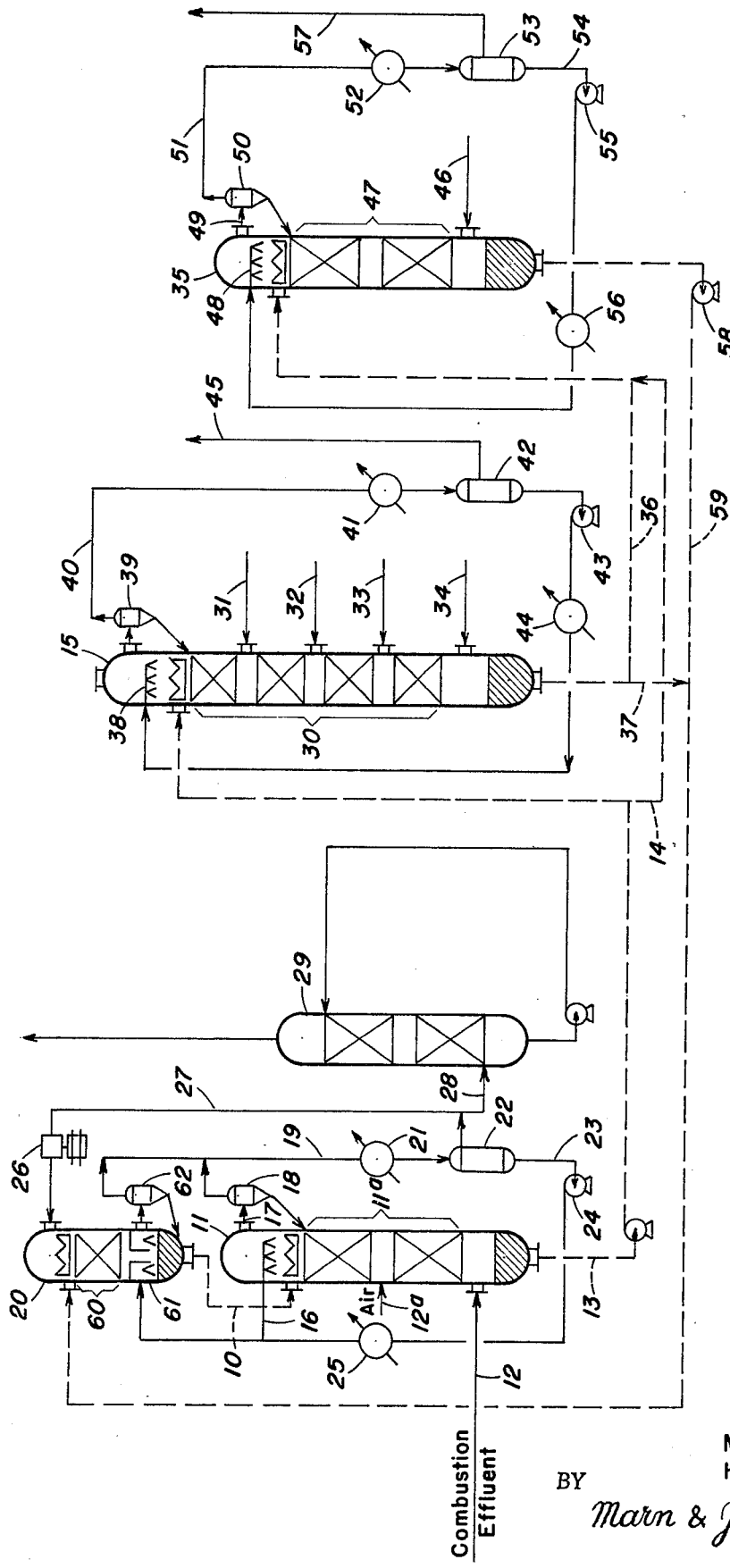

United States Patent [19]

Sze et al.

[11] 3,879,481

[45] Apr. 22, 1975

[54] PRODUCTION OF VINYL CHLORIDE

[75] Inventors: Morgan C. Sze, Garden City, N.Y.; Herbert Riegel, Maplewood, N.J.

[73] Assignee: The Lummus Company, Bloomfield, N.J.

[22] Filed: Dec. 4, 1970

[21] Appl. No.: 95,030

Related U.S. Application Data

[63] Continuation-in-part of Ser. No. 630,079, April 11, 1967, abandoned, and a continuation-in-part of Ser. No. 831,414, June 9, 1969, abandoned, which is a continuation-in-part of Ser. No. 614,338, Feb. 6, 1967, abandoned.

[52] U.S. Cl. ...... 267/656 R; 260/654 R; 260/654 H; 260/659 R; 260/660
[51] Int. Cl. ............................................. C07c 21/02
[58] Field of Search ........ 260/656 R, 659 A, 662 A; 23/154

[56] References Cited
UNITED STATES PATENTS

| | | | |
|---|---|---|---|
| 2,140,547 | 12/1938 | Reilly | 260/656 |
| 2,838,577 | 6/1958 | Cook et al. | 260/656 |
| 3,268,296 | 8/1966 | Hall et al. | 23/154 |
| 3,291,846 | 12/1966 | Otsuka et al. | 260/656 |

FOREIGN PATENTS OR APPLICATIONS

| | | | |
|---|---|---|---|
| 705,925 | 3/1965 | Canada | 260/659 |
| 711,287 | 6/1965 | Canada | 260/659 |
| 892,272 | 3/1962 | United Kingdom | 260/656 |

*Primary Examiner*—Leon Zitver
*Assistant Examiner*—A. Siegel
*Attorney, Agent, or Firm*—Marn & Jangarathis

[57] ABSTRACT

Process for producing vinyl chloride wherein ethane and/or ethylene and chlorine and/or hydrogen chloride are contacted in a first reactor with a melt including a multivalent metal chloride in its higher and lower valence state and the oxychloride of the metal; e.g., cuprous and cupric chloride and copper oxychloride, to produce a chlorinated hydrocarbon effluent, including vinyl chloride, ethyl chloride, dichloroethane and other chlorinated hydrocarbons. The ethyl chloride is recycled to the first reactor and the dichloroethane is dehydrochlorinated in a second reactor to vinyl chloride by contact thereof with a melt of a multivalent metal chloride in the higher and lower valence state. Either all or a portion of the other chlorinated hydrocarbons are burned to produce a combustion effluent including chloride and/or hydrogen chloride, which is contacted in a third reactor with molecular oxygen and the melt containing a multivalent metal chloride in its higher and lower valence state, whereby chlorine and/or hydrogen chloride are absorbed from the effluent by addition of chlorine to the melt and in addition the oxychloride is produced. The melt from the third reactor is employed in the first reactor.

17 Claims, 2 Drawing Figures

Fig. I.

INVENTORS
Morgan C. Sze
Herbert Riegel
BY
Marn & Jangarathis

PRODUCTION OF VINYL CHLORIDE

This application is a continuation-in-part of application Ser. No. 630,079 filed on April 11, 1967 and of application Ser. No. 831,414, filed on June 9, 1969, the aforementioned application being a continuation-in-part of application Ser. No. 614,338, filed on Feb. 6, 1967 all abandoned.

This invention relates to the production of vinyl chloride and more particularly to the production of vinyl chloride from ethane and/or ethylene. Still more particularly, this invention relates to an overall process for producing vinyl chloride which effectively utilizes chlorine values.

Vinyl chloride is generally produced from ethylene and chlorine by the chlorination of ethylene to dichloroethane and the decomposition of dichloroethane to vinyl chloride. The overall economics of the process is dependent on the effective utilization of overall chlorine values, and to date, the prior art processes do not effectively utilize such chlorine values.

Accordingly, an object of this invention is to provide a new and improved process for producing vinyl chloride.

Another object of this invention is to provide a process for producing vinyl chloride which effectively utilizes chlorine values.

A further object of this invention is to provide a process for producing vinyl chloride wherein essentially all chlorine values may be utilized for the production of vinyl chloride.

Figure 2:
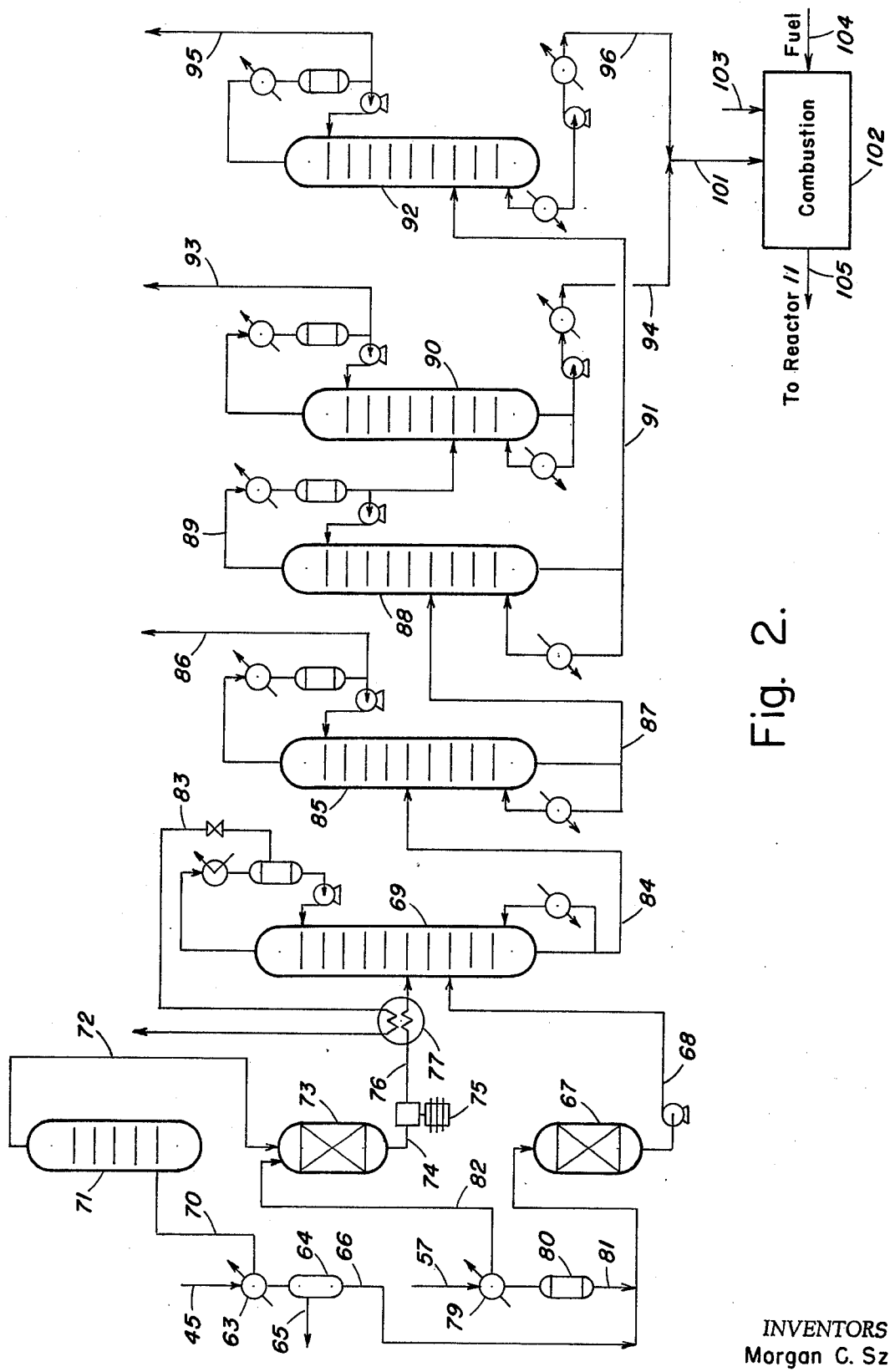

These and other objects of the invention should be more readily apparent from reading the following detailed description of the invention with reference to the accompanying drawings wherein:

FIG. 1 is a simplified schematic flow diagram of the reaction portion of an overall embodiment of the invention; and FIG. 2 is a simplified schematic flow diagram of the separation of recovery portion of an overall embodiment of the invention.

The objects of this invention are broadly accomplished by contacting in a first reaction zone a feed containing ethane and/or ethylene with hydrogen chloride and/or chlorine and a melt, containing a multivalent metal chloride in both its higher and lower valence state and the oxychloride of the metal, to produce an effluent containing chlorinated hydrocarbons, including vinyl chloride, dichloroethane, ethyl chloride and other chlorinated hydrocarbons. The effluent is passed to a separation and recovery zone to recover vinyl chloride product, ethyl chloride, dichloroethane and the other chlorinated hydrocarbons, with the recovered ethyl chloride preferably being recycled to the first reaction zone. The dichloroethane is introduced into a second reaction zone and contacted therein with a melt containing a multivalent metal chloride in both its higher and lower valence state and optionally also the oxychloride of the metal, to dehydrochlorinate the dichloroethane to vinyl chloride, with the effluent from the second reaction zone also being introduced into the separation and recovery zone to recover the various components thereof. Either all or a portion of the other chlorinated hydrocarbons recovered in the separation and recovery zone are burned to produce an effluent containing chlorine and/or hydrogen chloride, generally a mixture of both, and other combustion products, including water, carbon oxides and nitrogen. The combustion effluent and a molecular oxygen containing gas are introduced into a third reaction zone and contacted therein with a melt containing a multivalent metal chloride, in both its higher and lower valence state, resulting in selective absorption of the chlorine and/or hydrogen chloride from the combustion effluent by reaction with the melt to increase the chlorine content thereof and also oxygenation of the melt. The oxygenated and chlorinated melt from the third reaction zone is then passed to the first reaction zone to contact the ethane and/or ethylene feed. Thus, the overall process results in substantially complete utilization of chlorine values to produce a single chlorinated reaction product, vinyl chloride, with vinyl chloride being produced in both the first reaction zone, hereinafter sometimes referred to as a "chlorination zone" although reactions other than chlorination are effected therein, and in the second reaction zone, hereinafter sometimes referred to as the "dehydrochlorination zone" although reactions other than dehydrochlorination may also be effected therein.

The melt contains a chloride of a multivalent metal; i.e., a metal having more than one positive valence state, such as manganese, iron, copper, cobalt, and chromium, preferably copper. In the case of higher melting multivalent metal chlorides, such as copper chlorides, a chloride of a univalent metal; i.e., a metal having only one positive valence state, which is nonvolatile and resistant to the action of oxygen under the process conditions is added to the multivalent metal chloride to form a molten salt mixture having a reduced melting point. The univalent metal chlorides, are preferably alkali metal chlorides, such as potassium and lithium chloride in particular, but it is to be understood that other metal chlorides and mixtures thereof, such as the heavy metal chlorides of Groups I, II, III and IV of the Periodic Table, e.g., zinc, silver, and thallium chloride, may also be employed. The univalent metal chlorides are generally added in an amount sufficient to adjust the melting point of the molten salt mixture to a temperature of below about 500°F., and in the case of a salt mixture of copper chloride and potassium chloride, the composition of the melt ranges between about 20 percent and about 40 percent, preferably about 30 percent, by weight, potassium chloride, with the remainder being copper chloride. It is to be understood, however, that in some cases the catalyst melt may have a melting point higher than 500°F., provided the catalyst remains in the form of the melt throughout the processing steps. It is further to be understood that the melt may contain a mixture of multivalent metal chlorides or other reaction promoters. It is also to be understood that in some cases, metal chloride may be maintained as a melt without the addition of a univalent metal halide.

The reaction sequence for converting ethane and/or ethylene to vinyl chloride in the chlorination zone, using copper as a representative example of a multivalent metal is believed to be represented by the following equations:

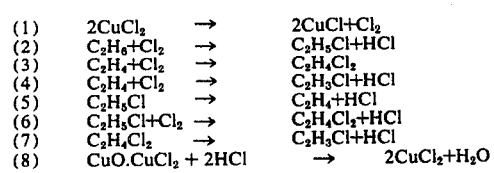

The chlorination reaction for producing vinyl chloride is represented by the following overall equations:

(9)  $C_2H_6 + 1/2Cl_2 + 3/4O_2 \rightarrow C_2H_3Cl + 3/2H_2O$
(10) $C_2H_6 + HCl + O_2 \rightarrow C_2H_3Cl + 2H_2O$
(11) $C_2H_4 + 1/2Cl_2 + 1/4O_2 \rightarrow C_2H_3Cl + 1/2H_2O$
(12) $C_2H_4 + HCl + 1/2O_2 \rightarrow C_2H_3Cl + H_2O$ Thus, the overall reaction requires the addition of hydrogen chloride and/or chlorine to the system.

The reaction in the chlorination zone produces chlorinated hydrocarbons in addition to vinyl chloride, including ethyl chloride, dichloroethane (primary 1,2-dichloroethane) and various quantities of one or more of the following: 1,1-dichloroethylene, cis or trans-1,2-dichloroethylene, trichloroethylene, trichloroethane, tetrachloroethane, tetrachloroethylene, and in accordance with the invention, all or a portion of such chlorinated hydrocarbons are recovered and treated to recover the chlorine values thereof for production of vinyl chloride.

The dichloroethane recovered from the chlorination reaction effluent is introduced into the dehydrochlorination zone wherein the dichloroethane is contacted with a melt containing a multivalent metal chloride in both its higher and lower valence state, with the reaction being presented by the hereinabove equation (7):

7. $C_2H_4Cl_2 \rightarrow C_2H_3Cl + HCl$

The melt preferably also contains the oxychloride of the multivalent metal whereby there is essentially no net production of hydrogen chloride, as represented by hereinabove equation (8):

8. $2HCl + CuO \cdot CuCl_2 \rightarrow 2CuCl_2 + H_2O$

The chlorination and dehydrochlorination zones are generally operated at temperatures from about 700° to about 1200°F., although the temperatures may be as low as 575°F., and at pressures from about 1 to about 20 atmospheres. The contacting of the feed and melt is generally effected in a countercurrent fashion, preferably with the feed as a continuous vapor phase, at residence times from about 1 to about 60 seconds although longer residence times may be employed.

A chlorinated hydrocarbon byproduct stream recovered from the chlorination zone effluent containing one or more of the following: 1,1-dichloroethylene, cis or trans-1,2-dichloroethylene, trichloroethylene, tetrachloroethylene, trichloroethane, tetrachloroethane, is burned to produce a combustion effluent, containing chlorine and/or hydrogen chloride generally both chlorine and hydrogen chloride, in addition to water, carbon dioxide, carbon monoxide and nitrogen. The combustion may be effected over a wide range of conditions, generally at temperatures between about 1000°F. and about 3000°F. and pressures between about 1 and about 30 atmospheres, by contacting the chlorinated hydrocarbons with a gas containing molecular oxygen, e.g., air, with the gas generally containing sufficient oxygen to supply at least about one mole of oxygen per atom of carbon and one quarter-mole per atom of hydrogen. In some cases, in order to maintain the desired combustion conditions fuel is added to the combustion feed, and in such cases, sufficient oxygen must be present to meet the oxygen requirements for the fuel.

It should be readily apparent that the above conditions are only illustrative and that optimum conditions will vary, with the choice of such optimum conditions being within the scope of those skilled in the art from the teachings herein.

The chlorine and/or hydrogen chloride are recovered from the combustion effluent in the third reaction zone by contacting the effluent and a free oxygen-containing gas with a melt containing a multivalent metal chloride in both the higher and lower valence state, with the various reactions, using copper as a representative multivalent metal, being represented by the following equations:

(13) $2CuCl + Cl_2 \rightarrow 2CuCl_2$
(14) $2CuCl + 1/2O_2 \rightarrow CuO \cdot CuCl_2$
(8)  $CuO \cdot CuCl_2 + 2HCl \rightarrow 2CuCl_2 + H_2O$ The contacting of the combustion effluent with the melt and the oxygen-containing gas results in selective absorption of the chlorine and/or hydrogen chloride from the combustion melt, resulting in an increase in the chloride value of the melt; i.e., the melt is enriched in cupric chloride.

The contacting in the third reaction zone is generally effected at temperatures from about 600°F. to about 900°F. (although higher temperatures may be employed; e.g., up to about 1200°F., but are generally not preferred as a result of poor oxygen absorption by the melt), pressures from about 1 to about 20 atmospheres and residence time from about 1 to about 60 seconds, although longer residence times may also be employed. The contacting is preferably effected in a countercurrent fashion with the combustion effluent and oxygen-containing gas as a continuous vapor phase.

The oxygen requirements for absorbing the hydrogen chloride from the melt may be supplied to the reaction from either an external source or by effecting the combustion of the chlorinated hydrocarbons with an excess of oxygen, whereby the molecular oxygen for the reaction is provided with the combustion effluent. The melt from the third reaction zone is to be employed in the chlorination reaction and, therefore, as hereinabove described, the melt withdrawn from the third reaction zone should also contain oxychloride. Therefore, the oxygen provided to the third reaction zone is in an amount sufficient to effect both recovery of the hydrogen chloride from the combustion effluent and provide a net production of oxychloride for use in the chlorination and/or dehydrochlorination reactors.

It should be apparent from the hereinabove noted reaction sequences, that the melt containing the multivalent metal chloride, in some cases, participates in the reaction sequence and accordingly does not behave only as a catalyst. Thus, for example, the melt functions to transfer oxygen, and as should be apparent from the hereinabove noted equations, sufficient oxychloride must be produced to provide the oxygen requirements for the reactions, such requirements being greater for ethane as compared to ethylene, and greater for hydrogen chloride as compared to chlorine.

The melt, in addition to functioning as a reactant and/or catalyst is a temperature regulator. Thus, the circulating melt has a high heat absorption capacity thereby preventing runaway reaction during the exothermic chlorination and oxygen contacting steps. The absorbed heat of reaction may be employed to both heat the various reactants to reaction temperature and supply heat for the endothermic dehydrochlorination.

It should be apparent, however, that if additional heat is required, such heat may be supplied from an external source. It should also be apparent that the heat absorption capacity of the melt functions to maintain essentially isothermal conditions during the reaction.

The invention will now be further described with reference to an embodiment thereof illustrated in the accompanying drawings. It is to be understood however, that the scope of the invention is not to be limited thereby.

Referring now to FIG. 1, a molten chloride salt such as a mixture of cupric and cuprous chloride in line 10 at a temperature of from 600°F. to 900°F. is introduced into the top of an oxidation vessel 11 maintained at a pressure of from about 1 to about 20 atms. A combustion effluent in line 12 obtained by the combustion of chlorinated hydrocarbon by-products, as hereinafter described, containing chlorine, hydrogen chloride, carbon oxides (carbon dioxide and/or carbon monoxide) water, nitrogen and optionally oxygen, and a compressed molecular oxygen-containing gas, such as air, in line 12a are both introduced into the vessel 11 and passed in countercurrent contact to the descending molten salt. The vessel 11 may be provided with one or more sections of packing, generally indicated as 11a, to promote intimate and effective contact between the compressed gas, combustion effluent and molten salt. The molten salt is oxidized to produce oxychlorides, and the hydrogen chloride and chlorine are absorbed from the combustion effluent resulting in a net increase in the cupric chloride content of the melt, with the concurrent evolution of heat. The residence time of the molten salt within the vessel 11 is from about 1 to about 120 seconds.

The effluent gas, containing the remainder of the combustion effluent essentially free of chlorine and hydrogen chloride, leaving the packing near the top of vessel 11 is at a temperature of from about 600°F. to 900°F., and is contacted with a spray of quench liquid in line 16 to provide a temperature of about 200°F. to 400°F. The gas is cooled by such contact with the result that vaporized and entrained salts are condensed and eliminated from the gas stream. The quench liquid spray is concurrently vaporized and, together with the effluent gas, is withdrawn from the top of vessel 11. The total gaseous effluent is passed though line 17 to a cyclone separator 18 from the elimination of any solid material which is returned to the vessel 11. The gaseous effluent is thereafter combined with another gaseous effluent in line 19 as more fully hereinafter described. The combined gaseous effluent is cooled to about 100°F. to 150°F. in heat exchanger 21 to condense out the vaporized quench liquid. The condensed quench liquid is separated from the remaining gaseous effluent in vapor/liquid separator 22. The quench liquid is passed through line 23 by pump 24 to heat exchanger 25 to cool the quench liquid to a temperature of about 100°F., with a portion being returned to the upper portion of vessel 11. The gaseous effluent in separator 22 is divided, with a portion being passed through line 28 into a caustic scrubber 29. From scrubber 29, inert gases, such as nitrogen introduced with both the oxygen in the oxygen-containing feed gas and the combustion effluent are readily discharged from the reactor system.

The molten salt, now containing the copper oxychloride and enriched in cupric chloride at a temperature of from about 700°F. to 1200°F. is withdrawn from the bottom of vessel 11 through line 13 and passed to the top of a reactor 15. Alternatively, a portion of the molten salt in line 13 may be passed through line 14 for introduction into a dehydrochlorination reactor, as hereinafter described. The reactor 15 is operated at a temperature of from about 700°F. to about 1200°F., at a pressure of from 1 to 20 atmospheres, and a residence time of 1 to 60 seconds. The reactor 15 is provided with sections of packings, generally indicated as 30, designed to effect intimate and effective contact between the gaseous feed components and the molten salt as more fully hereinafter described. Fresh feed hydrogen chloride, if any, and recycle ethyl chloride, as more fully hereinafter described, at a temperature of from 100°F. to 200°F., are introduced into the upper portion of reactor 15 through line 31. Combined recycle components ethane, ethylene and hydrogen chloride at a temperature of from 100°F. to 200F. are introduced into reactor 15 through line 32 at a point below line 31. The introduction into reactor 15 of the recycle streams and the fresh hydrogen chloride stream (if any) may be further divided, reversed in position, or may be combined into one stream.

Fresh chlorine is introduced into reactor 15 through line 33 at a point below the recycle feed positions 31 and 32. Fresh feed ethane, ethylene, or mixtures thereof, is introduced through line 34 into reactor 15 near the lower portion thereof. The hydrocarbon fresh feed in line 34 should be introduced at or near the bottom of the reactor 15.

The gaseous effluent at the top of the upper packed section in reactor vessel 15 is at a temperature between 700°F. and 1200°F., and is cooled by a spray of quench liquid in line 38 to about 300°F. Such temperature is above the dew point temperature of the combined gaseous reaction effluent and vaporized quench liquid. The total gaseous effluent is passed into cyclone separator 39 to remove any solids and is then passed through line 40 to condenser 41 to condense the quench liquid. The mixed vapor/liquid stream is introduced into separator 42 with the condensed quench liquid being passed by pump 43 to cooler 44 wherein the liquid is cooled to about 150°F. The cooled quench liquid is then passed to spray device 38 in reactor 15. The gaseous effluent from separator 42 at about 230°F. is passed through line 45 to a separation section illustrated in FIG. 2 as hereinafter more fully described.

The molten salt withdrawn from the bottom of reactor 15 is at a temperature of from about 700°F. to 1200°F., and is passed through line 36 to the top of dehydrochlorination reactor 35 along with any melt in line 14. Alternatively, all or a portion of the melt from the reactor 15 may be passed through line 37 for return to vessel 11 as hereinafter described. Dechloroethane separated in said separation section, is introduced through line 46 at a temperature of about 300°F. into the bottom of the dehydrochlorination reactor 35. Dehydrochlorination reactor 35 includes one or more packed sections, generally indicated as 47, to effect intimate and effective contact between the dichloroethane and molten salt. The dichloroethane is passed in countercurrent contact with the melt to effect the endothermic dehydrochlorination of the dichloroethane to yield vinyl chloride and hydrogen chloride. If the melt also contains copper oxychloride, the amount of hydrogen chloride is the reaction effluent is decreased.

The reaction is conducted at a temperature of from about 700°F. to about 1200°F., a pressure of about 1 to about 20 atmospheres, with a residence time of about 1 to about 60 seconds. it will be understood that the dichloroethane may also flow cocurrently downwardly with the molten salt.

The gaseous effluent leaving the top of the upper packed section of dehydrochlorination reactor 35 at a temperature of about 700°F. to 1200°F. is cooled by means of a spray of quench liquid through spray device 48 to lower the temperature of the gaseous effluent and the now vaporized quench liquid to between 300°F. and 400°F. thereby eliminating entrained and vaporized salts. The total gaseous effluent is withdrawn from the upper part of the reactor 35 through line 49 and is passed into cyclone separator 50 where any solids are removed. The gaseous effluent from separator 50 is passed through line 51 into condenser 52 where, at a temperature of about 150°F. to 200°F., the quench liquid is condensed. The mixed vapor/liquid stream is thereafter passed into separator 53, from which the condensed quench liquid is passed through line 54 by pump 55 to cooler heat exchanger 56 wherein the temperature of the quench liquid is lowered to about 80°F. to 120°F. The cooled quench liquid is then passed to spray device 48 in the top of reactor 35. The effluent vapor at 150°F. to 200°F. withdrawn from separator vessel 53 is passed through line 57 to the separation section, as more fully hereinafter described. The molten salt at the bottom of the reactor 35, which is at a temperature lower than at the inlet to said reactor 35 is withdrawn through line 59 combined with any molten salt in line 37 and passed to the top of direct heat exchange vessel 20.

Heat exchange vessel 20 comprises one or more packed sections, generally indicated as 60. A portion of the gas withdrawn from separator 22 through line 27, is compressed in compressor 26, and introduced into the top of heat exchange vessel 20 wherein the compressed gas is passed in direct heat exchange contact with the molten salt introduced through line 59. The gas and the molten salt are cocurrently passed over the packed sections 60 and are disengaged in the bottom of the heat exchange vessel 20. The gas is cooled by a spray of quench liquid through spray device 61 to eliminate any vaporized or entrained halide salt. A gaseous effluent comprised of the gas introduced through line 27 and now vaporized quench liquid is withdrawn from vessel 20 and passed into cyclone separator 62 to remove solids therefrom; the solids being returned to the bottom of exchanger 20. The gaseous effluent withdrawn from separator 62 is passed through line 19 and combined with the gaseous effluent from oxidation vessel 11. The combined gaseous effluent is passed through condenser 21 to condense the quench liquid. The principal purpose of the heat exchange vessel 20 is to bring the molten salt in line 59 to a constant and desired temperature prior to passing the molten salt through line 10 to the top of oxidation vessel 11.

Referring now to FIG. 2, the reactor effluent from reactor 15 in line 45 is comprised of vinyl chloride, hydrogen chloride, dichloroethane, ethyl chloride, water and other chlorinated hydrocarbons including one or more of the following: dichloroethylene, trichloroethylene, trichloroethane, tetrachloroethylene, tetrachloroethane. The reactor effluent is cooled to about 80°F. to 100°F. in condenser 63 primarily to condense water and heavier chlorinated hydrocarbons. The condensed water and heavier chlorinated hydrocarbons are passed to separator 64 wherein the water and heavier chlorinated hydrocarbons separate into two phases. The water withdrawn from separator 64 in line 65 is neutralized and stripped of entrained and dissolved chlorinated hydrocarbon in a stripping column (not shown). The chlorinated hydrocarbons are withdrawn from vessel 64 through line 66 and combined with any chlorinated hydrocarbons received from the water in the stripping column (not shown) for further processing.

The uncondensed portion of the reactor effluent gaseous stream is withdrawn from the condenser 63 through line 70 and introduced into an absorption column 71 wherein any acid gases, principally any carbon dioxide present, are removed by any of several well-known acid gas absorption or adsorption systems. A gaseous effluent is withdrawn from absorption column 71 through line 72 and is passed into dryer 73 for removal of residual water.

The effluent vapor in line 57 from the dehydrochlorination reactor 35 (see FIG. 1) is passed through a condenser 79 wherein the effluent vapor is cooled to about 80°F. to about 120°F., primarily to condense unconverted dichloroethane which is passed to vessel 80. The unconverted dichloroethane withdrawn from condenser 80 through line 81 is combined with chlorinated hydrocarbons in line 66. The combined stream is passed through dryer 67 and is introduced through line 68 into distillation column 69. The uncondensed gaseous effluent in condenser 79 is withdrawn through line 82 and is passed into dryer 73 wherein the uncondensed gaseous effluent is combined with gaseous effluent in line 72. The dried gas withdrawn from dryer 73 through line 74 is passed to compressor 75 and compressed to about 10 to about 30 atmospheres. The compressed gas is thereafter passed through line 76 through heat exchanger 77 and is introduced into distillation column 69.

The distillation column 69 is operated at temperatures and pressures to produce a gaseous overhead comprised of ethane, ethylene and hydrogen chloride. The gaseous overhead withdrawn from column 69 in line 83 is passed through heat exchanger 77 and is introduced into reactor vessel 15, through line 32, as shown in FIG. 1. A bottoms consisting of chlorinated hydrocarbons is withdrawn from column 69 through line 84 and introduced into a distillation column 85.

The distillation column 85 is operated at temperatures and pressures to form an overhead primarily comprised of vinyl chloride with minor amounts of impurities. An overhead withdrawn from column 85 through line 86 is passed to a purification system (not shown) to produce monomer grade vinyl chloride. The column bottoms from distillation column 85 is withdrawn through line 87 and passed to a distillation column 88.

The distillation column 88 is operated at temperatures and pressures to produce an overhead stream consisting of all remaining chlorinated hydrocarbons boiling below dichloroethane. An overhead stream from column 88 is withdrawn through line 89 and introduced into a distillation column 90. A bottoms product from distillation column 88 containing dichloroethane and higher boiling chlorinated products is withdrawn through line 91 and introduced into a distillation column 92.

The distillation column 90 is operated at pressures and temperatures designed to form an overhead stream substantially comprised of pure ethyl chloride which is withdrawn from column 90 through line 93 and introduced into reactor 15 through line 31, as shown in FIG. 1. A bottoms from distillation column 90 consisting largely of dichloroethylenes is withdrawn therefrom through line 94.

The distillation column 92 is operated at temperatures and pressures designed to produce an overhead comprised substantially of dichloroethane (primarily 1,2-dichloroethane) which is withdrawn from column 92 through line 95 and introduced into the dehydrochlorination reactor 35 through line 46, as shown in FIG. 1. The bottoms stream from distillation column 92 consisting primarily of trichloroethylene, trichloroethane, perchloroethylene and tetrachloroethane, is withdrawn therefrom through line 96.

The chlorinated hydrocarbons in lines 94 and 96 are combined in line 101 and introduced into a combustion chamber, schematically indicated as 102, along with air in line 103. Auxiliary fuel, if needed, may be added to the combustion chamber 102 through line 104. The chlorinated hydrocarbons are burned in combustion chamber 102, as hereinabove described, and a combustion effluent, including hydrogen chloride, chlorine, carbon oxides, water vapor and nitrogen, and optionally oxygen, is withdrawn from combustion chamber 102 through line 105 and introduced into reactor 11 through line 12 for recovery of chlorine and hydrogen chloride, as hereinabove described. It is to be understood that in some cases the dichloroethylenes may be recycled to the chlorination reactor instead of being introduced into the combustion chamber 102, whereby the dichloroethylenes are chlorinated to heavier products.

The hereinabove described embodiment of the invention may be modified in numerous ways within the spirit and scope of the invention. Thus, for example, the feeds may be introduced into the various columns in a manner other than as particularly described; e.g., the oxygen-containing gas and combustion effluent may be mixed prior to introduction into reactor 11. As another modification, various equipment may be employed for transferring the molten salt to the various reactors by an inert gas lift. As a further modification, only a portion of the recovered heavier chlorinated hydrocarbons may be subjected to the burning, if a portion of the heavier chlorinated hydrocarbons have other uses. Thus, basically the overall process contemplates recovery of the chlorine values from chlorinated hydrocarbons which are not otherwise readily marketable.

These modifications and other modifications should be apparent to those skilled in the art from the teachings herein.

The following example further illustrates the invention, but it is to be understood that the scope of the invention is not to be limited thereby.

EXAMPLE

This example is illustrative of processing conditions which may be employed to produce vinyl chloride at a rate of about 18,770 lbs./hr., with the various conditions and flow rates being tabulated in the following table:

TABLE

| STREAM | 12A | 12 | 10 | 13 | 28 | 31 | 32 | 33 | 34 | 45 | 46 | 57 | 86 | 101 | 103 |
|---|---|---|---|---|---|---|---|---|---|---|---|---|---|---|---|
| TEMP. °F. | 300° | 1000° | 783° | 852° | 70° | 100° | 95° | 70° | 70° | 235° | 300° | 185° | 80° | 100° | 70° |
| PRESSURE PSIG. | 50 | 50 | 50 | 90 | 5 | 50 | 50 | 50 | 50 | 40 | 50 | 40 | 59 | 60 | 60 |
| COMPONENT (LB. MOL/HR.) | | | | | | | | | | | | | | | |
| $O_2$ | 250 | 28 | | | 48 | | | | | | | | | | 121 |
| $N_2$ | 946 | 456 | | | 1402 | | | | | | | | | | 456 |
| CO | | | | | | | 2 | | | 2 | | | | | |
| $CO_2$ | | 71 | | | 71 | | | | | 8 | | | | | |
| $Cl_2$ | | 44 | | | 1 | | | 151 | | 9 | | 173 | | | |
| HCl | | 8 | | | 1 | | 172 | | | 444 | | | | | 5 |
| $H_2O$ | 11 | 49 | | | 60 | | | | | | | | | | |
| $C_2H_4$ | | | | | | | 206 | | | 206 | | | | | |
| $C_2H_6$ | | | | | | | 311 | | 336 | 311 | | | | | |
| $C_2H_3Cl$ | | | | | | 3 | 2 | | | 133 | | 173 | 300 | | |
| $C_2H_5Cl$ | | | | | | 142 | | | | 142 | | | 03 | | |
| $C_2H_2Cl_2$ | | | | | | 8 | | | | 14 | | 1 | | 7 | |
| $C_2H_4Cl_2$ | | | | | | 7 | | | | 181 | 188 | 14 | | 8 | |
| $C_2H_3Cl_3$ | | | | | | | | | | 10 | | 1 | | 11 | |
| $C_2HCl_3$ | | | | | | | | | | 1 | 4 | 4 | | 1 | |
| $C_3H_6Cl_2$ | | | | | | | | | | 1 | | | | 1 | |
| $C_2Cl_4$ | | | | | | | | | | 7 | | | | 7 | |
| $CCl_4$ | | | | | | | | | | 2 | 1 | | | 1 | |
| CuO | | | | 460 | | | | | | | | | | | |
| CuCl | | | 17400 | 16380 | | | | | | | | | | | |
| $CuCl_2$ | | | 3800 | 4360 | | | | | | | | | | | |
| KCl | | | 12900 | 12900 | | | | | | | | | | | |

The overall process of the invention is extremely effective for the production of vinyl chloride in that chlorinated intermediates are effectively converted to the desired vinyl chloride reaction product. Thus, the dichloroethane, primarily 1,2-dichloroethane, produced from the chlorination of ethane and/or ethylene is effectively converted to vinyl chloride by the use of the molten salts in accordance with the present invention. Thus, it has been found that the dehydrochlorination of dichloroethane in the presence of the molten salts provides high conversion of dichloroethane in addition to high selectivity to vinyl chloride. Furthermore, the chlorinated hydrocarbons which are not readily convertible to vinyl chloride are treated to recover the chlorine values therefrom effectively utilizing essentially all chlorine values to produce the desired vinyl chloride product. Thus, in accordance with the present invention ethane, oxygen and chlorine, as fresh feed, may be effectively converted to vinyl chloride without the necessity to find commercial uses for various by-products.

Numerous modifications and variations of the present invention are possible in light of the above teachings and therefore within the scope of the appended claims the invention may be practiced otherwise than as particularly described.

What is claimed is:

1. A process for producing vinyl chloride comprising:
   a. contacting a hydrocarbon selected from the group consisting of ethane, ethylene and mixtures thereof and a member selected from the group consisting of chlorine, hydrogen chloride and mixtures thereof with a melt containing a multivalent metal chloride in both its higher and lower valence state and the oxychloride of the metal to produce a chlorinated hydrocarbon-containing effluent including vinyl chloride, ethyl chloride, dichloroethane and other chlorinated hydrocarbons selected from the group consisting of dichloroethylenes, tetrachloroethane, tetrachloroethylene, trichloroethane, trichloroethylene and mixtures thereof:
   b. recovering vinyl chloride, ethyl chloride, dichloroethane and the other chlorinated hydrocarbons from the chlorinated hydrocarbon-containing effluent;
   c. contacting recovered dichloroethnae with a melt containing a multivalent metal chloride in both its higher and lower valence state to produce a reaction effluent containing vinyl chloride;
   d. burning at least a portion of the recovered said other chlorinated hydrocarbons from step (b) to produce a combustion effluent containing a member selected from the group consisting of chlorine, hydrogen chloride and mixtures thereof and in addition carbon oxides, nitrogen and water vapor;
   e. contacting the combustion effluent and a molecular oxygen-containing gas with melt from step (c), resulting in absorption of the member from the combustion effluent by addition of chlorine to the melt and the production of the metal oxychloride; and
   f. employing at least a portion of the melt from step (e) in step (a).

2. The process as defined in claim 1 wherein said contacting of steps (a) and (c) is effected at a temperature from about 700°F. to about 1200°F. and the contacting of steps (e) is effected at a temperature from about 600°F. to about 900°F.

3. The process as defined in claim 2 wherein the melt further includes a univalent metal chloride.

4. The process as defined in claim 3 wherein said multivalent metal is copper.

5. The process as defined in claim 3 wherein the univalent metal chloride is an alkali metal chloride.

6. The process as defined in claim 5 wherein the alkali metal chloride is potassium chloride.

7. The process as defined in claim 5 wherein said burning of step (d) is effected at a temperature from about 1000°F. to about 3000°F.

8. The process as defined in claim 7 wherein the melt employed in step (c) is obtained from step (a) and the melt employed in step (e) is obtained from step (c) whereby the melt is continuously circulated from step (a) to step (c) to step (e) and back to step (a).

9. The process as defined in claim 7 wherein the melt employed in step (c) is obtained from step (e) and melt from steps (a) and (c) is circulated to step (e).

10. A continuous process for producing vinyl chloride, comprising:
    a. contacting as fresh vapor feed ethane and a member selected from the group consisting of hydrogen chloride, chlorine and mixtures thereof and as recycle ethyl chloride, unreacted ethane and ethylene with a molten mixture comprising cuprous chloride, cupric chloride, copper oxychloride and potassium chloride, and contacting being effect at a temperature from about 700°F. to about 1200°F. to produce a reaction effluent comprising vinyl chloride, ethyl chloride, ethylene, unreacted ethane, 1,2-dichloroethane, other chlorinated hydrocarbons selected from the group consisting of dichloroethylenes, trichloroethylene, tetrachloroethylene, trichloroethane and tetrachloroethane and mixtures thereof;
    b. recovering vinyl chloride, 1,2-dichloroethane, ethyl chloride, ethylene and unreacted ethane from the reaction effluent;
    c. recycling ethyl chloride, unreacted ethane and ethylene to step (a);
    d. dehydrochlorinating 1,2-dichloroethane to vinyl chloride by contacting 1,2-dichloroethane at a temperature from about 700°F. to about 1200°F. with a molten mixture comprising cuprous chloride, cupric chloride and potassium chloride;
    e. buring at least a portion of the other chlorinated hydrocarbons to produce a combustion effluent comprising hydrogen chloride, chlorine, carbon oxides, water vapor and nitrogen;
    f. contacting the combustion effluent and a molecular oxygencontaining gas with melt from step (d) at a temperature from about 600°F. to about 900°F. resulting in absorption of the chlorine and hyrodgen chloride from the combustion effluent by chlorinating the melt to effect enrichment thereof with cupric chloride and to further produce copper oxychloride; and (g) passing at least a portion of the melt from step (f) to step (a).

11. The process as defined in claim 10 wherein at least a portion of the melt employed in step (e) is obtained from step (h).

12. The process as defined in claim 10 wherein the contacting effected in steps (a), (e) and (h) is effected countercurrently.

13. The process as defined in claim 10 wherein said combustion is effected at a temperature from about 1000°F. to about 3000°F.

14. The process of claim 10 wherein the molten mixture employed in step (c) is obtained from step (g) whereby said molten mixture further comprises copper oxychloride.

15. The process of claim 10 wherein the molten mixture employed is step (c) is obtained from step (a).

16. A continuous process for producing vinyl chloride, comprising:
    a. contacting in a first reaction zone a vapor feed comprising as fresh feed ethane, and a member selected from the group consisting of chlorine, hydrogen chloride and mixtures thereof and as recycle, ethane, ethylene, and ethyl chloride, with a melt containing cuprous chloride, cupric chloride, copper oxychloride and potassium chloride, said potassium chloride being present in an amount of from about 20 percent to about 40 percent, by weight, of the melt with the remainder being said copper chlorides and oxychlorides, said contacting being effected at a temperature from about 700°F. to about 1200°F.;

b. withdrawing a first gaseous effluent from the first reaction zone including ethane, ethylene, vinyl chloride, dichloroethane, ethyl chloride and other chlorinated hydrocarbons selected from the group consisting of dichloroethylene, trichloroethane, trichloroethylene, tetrachloroethane, tetrachloroethylene and mixtures thereof;

c. recovering from the first gaseous effluent and recycling to the first reaction zone ethane, ethylene, and ethyl chloride;

d. recovering vinyl chloride from the first gaseous effluent as reaction product;

e. recovering dichloroethane from the first gaseous effluent and introducing recovered dichloroethane into a second reaction zone wherein the dichloroethane is contacted with a melt including cupric chloride, cuprous chloride and potassium chloride, said potassium chloride being present in an amount from about 20 percent to about 40 percent, by weight, of the melt, said contacting being effected at a temperature from about 700°F. to about 1200°F. to dehydrochlorinate dichloroethane to vinyl chloride;

f. withdrawing a second gaseous effluent, including vinyl chloride from the second reaction zone and recovering therefrom, as reaction product, vinyl chloride;

g. recovering from the first gaseous effluent at least a portion of the other chlorinated hydrocarbons and effecting combustion thereof with molecular oxygen to produce a combustion effluent including hydrogen chloride, chlorine, carbon oxides, water vapor and nitrogen;

h. contacting the combustion effluent and a molecular oxygen-containing gas with melt recovered from step (e) at a temperature from about 600°F. to about 900°F. resulting in absorption of the chlorine and hydrogen chloride from the combustion effluent by addition of chlorine to the melt to effect enrichment thereof with cupric chloride and the production of copper oxychloride; and i. passing at least a portion of the melt from step (h) to step (a).

17. The process as defined in claim 16 wherein melt employed in step (e) is obtained from step (a) and said second gaseous effluent further comprises hydrogen chloride which is recovered and recycled to the first reaction zone.

* * * * *